Patented Nov. 4, 1930

1,780,395

UNITED STATES PATENT OFFICE

CARLTON L. KENNEDY, OF BRAINTREE, MASSACHUSETTS, ASSIGNOR TO THE HOLTZER-CABOT ELECTRIC COMPANY, OF ROXBURY, MASSACHUSETTS, A CORPORATION OF MASSACHUSETTS

CONDENSER INDUCTION MOTOR

Application filed November 28, 1928. Serial No. 322,461.

The present invention relates to condenser induction motors.

In the usual form of condenser induction motor, there is provided a main or line winding which is connected directly across the line and a condenser circuit which is also commonly connected across the line and which includes a condenser winding on the stator of the motor and condenser in series therewith. Although the reactance of the condenser is ordinarily of a high value and therefore acts to limit the current in the condenser circuit, nevertheless the presence of the condenser acts to place a high voltage across the condenser as well as across the terminals of the condenser winding. The values of these voltages in the condenser circuit are ordinarily higher than the line voltage because of the fact that the reactance of the condenser itself is negative with respect to the reactance of the condenser winding. The presence of these high voltages in the condenser circuit necessarily increases the expense of manufacture because of the precautions which must be taken to prevent breakdown of insulation in the windings. The line and condenser windings are usually placed together in the same slots of the stator and therefore the insulation between them is subjected to the maximum voltage which exists between different parts of the two windings. Particularly when the number of turns in the condenser winding considerably exceeds the number of turns in the line winding, these voltages may rise to such values as to require unduly expensive precautions against breakdown of the insulation between windings.

The object of the present invention is to provide a condenser induction motor in which the maximum voltages tending to break down the insulation between the condenser and line windings are greatly reduced. To this end, the present invention consists in the induction motor hereinafter described and particularly defined in the claims.

Figure 1:
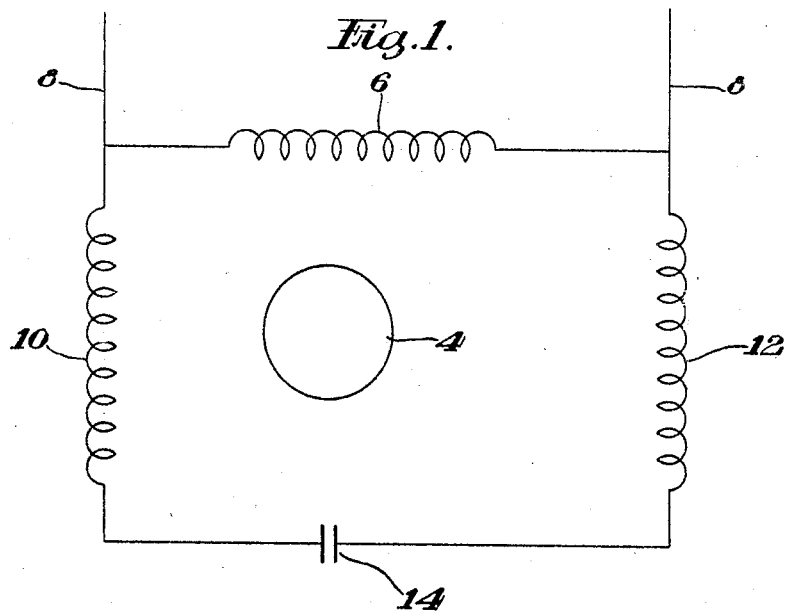
Figure 2:
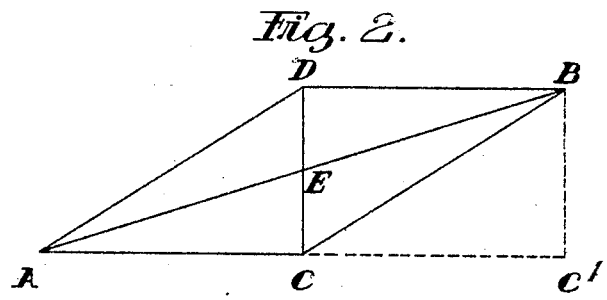
Figure 3:
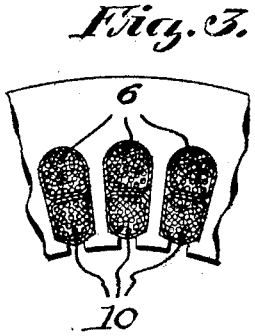

In the accompanying drawings, Fig. 1 is a diagram of the preferred form of the present invention; Fig. 2 is a vector diagram illustrating the magnitudes of the voltages in the line and condenser circuits and comparing the same with the voltages existing in a condenser induction motor of the usual type.; and Fig. 3 is a sectional view of a portion of the stator showing the disposition of main and condenser windings.

The illustrated embodiment of the invention employs a line winding which is adapted for connection directly to the line, together with a condenser circuit in which the condenser winding of the stator of the motor is composed of two series connected portions with the condenser between them. Referring to Fig. 1, the preferred form of motor comprises the rotor 4, the line or main winding 6 which is adapted to be connected to the line 8, two condenser windings 10 and 12, and a condenser 14. The windings 10 and 12 are similar to each other and are arranged in slots in the stator with relation to the main winding 6 such that the magnetic axes of the main and condenser windings are displaced at a considerable angle from each other, this displacement preferably approximating 90 electrical degrees. The condenser windings are placed in the slots of the stator along with the main winding, as shown in Fig. 3, which illustrates a portion of the stator having a part of the main winding 6 and the condenser winding 10 in the slots. The windings 10 and 12 with the condenser 14 together constitute the condenser circuit of the motor which is connected to the ends of the main or line winding 6.

With the construction shown in Fig. 1, the voltage existing between any point of the working winding and any point of either condenser winding is greatly reduced with respect to the voltage existing between similar parts of the windings in the ordinary form of condenser induction motor. This is illustrated in the vector diagram of Fig. 2 which shows the voltage conditions existing in a condenser induction motor having approximately three times as many turns in the combined condenser windings 10 and 12 as in the line winding 6. The line voltage is represented by the vector CD which for purposes of explanation may be assumed to be 110 volts. The voltage across the winding 10 is represented by AC and that across the winding 12 by DB. The voltages AC and DB are represented at 90° from the voltage CD because of the space displacement between the condenser and line windings on the stator. Assuming that both condenser windings together have three times as many turns as the line windings, the sum of the voltages AC and DB will be approximately 330 volts, this voltage being nearly proportional to the turns ratio of the condenser and line windings because of the transformer action existing through the rotor. The voltage across the condenser 14 is represented by AB, the vector sum of the voltages AC, CD and DB. The maximum voltage, however, which can exist between any part of the line winding and any part of either condenser winding is the vector AD or the vector CB. Since CD has been assumed to be 110 volts and AC and DB each 165 volts, the value of AD or CB will be approximately 198 volts, a value which is considerably less than the voltage across the condenser and not excessively greater than the line voltage.

The maximum insulation voltage AD which in the typical case described above has been found to be 198 volts, may be compared with the voltage which will exist in a condenser induction motor wherein the windings are connected in the usual manner. In the usual case, the windings 10 and 12 form a single winding and the condenser 14 is connected in series therewith. In that case, the line voltage is represented by the vector C'B shown in dotted lines and the voltage across the condenser winding by the vector AC' which are respectively 110 and 330 volts under the conditions assumed above. The maximum voltage which may exist between the line and condenser windings is therefore represented as the vector sum of AC' and C'B which is the vector AB and which is of a value of approximately 348 volts. Inasmuch as the difficulties of insulation increase rapidly as the voltage increases, it will be seen that the present invention provides a simple means whereby the insulation voltage may be maintained at a safe value.

Having thus described the invention, what is claimed is:

1. A condenser induction motor having, in combination, a line winding, a condenser circuit including a condenser and a pair of condenser windings, the line and condenser windings being wound in the same slots of the stator, the condenser windings and the condenser being connected all in series with the condenser between the condenser windings, whereby the voltage between the line and condenser windings is limited to a safe value.

2. A condenser induction motor having, in combination, a line winding adapted to be connected across the line, and a condenser circuit connected in parallel with the line winding and including two condenser windings and a condenser all in series, the line and condenser windings being wound in the same slots of the stator, one end of each condenser winding being connected to the condenser to place the condenser between the two condenser windings, whereby the maximum voltage between the line and condenser windings is materially less than the voltage across the condenser.

In testimony whereof I have signed my name to this specification.

CARLTON L. KENNEDY.